United States Patent [19]

Harada

[11] Patent Number: 4,513,636
[45] Date of Patent: Apr. 30, 1985

[54] GEARING TRANSMISSION
[75] Inventor: Denzaburo Harada, Katano, Japan
[73] Assignee: Kubota, Ltd., Osaka, Japan
[21] Appl. No.: 451,369
[22] Filed: Dec. 20, 1982
[30] Foreign Application Priority Data Feb. 1, 1982 [JP] Japan ............... 57-13383[U]

[51] Int. Cl.³ ............................................. F16H 57/10
[52] U.S. Cl. ...................................... 74/761; 74/753; 74/766
[58] Field of Search .............. 74/760, 761, 766, 767, 74/753, 754

[56] References Cited

U.S. PATENT DOCUMENTS

| | | | |
|---|---|---|---|
| 3,004,446 | 10/1961 | Flinn | 74/754 X |
| 3,274,858 | 9/1966 | Meyer et al. | 74/761 |
| 3,298,252 | 1/1967 | Harris et al. | 74/761 |
| 3,314,307 | 4/1967 | Egbert | 74/753 |
| 3,411,382 | 11/1968 | Mori | 74/695 X |
| 3,446,094 | 5/1969 | Ohno | 74/695 X |
| 3,513,722 | 5/1970 | Mori et al. | 74/695 |
| 3,710,649 | 1/1973 | Kubo | 74/753 |
| 3,714,847 | 2/1973 | Ushijima | 74/753 |
| 3,859,871 | 1/1975 | Vozumi et al. | 74/761 |
| 4,043,225 | 8/1977 | Momose | 74/761 |

FOREIGN PATENT DOCUMENTS 2023752  1/1980  United Kingdom ............ 74/761

Primary Examiner—Lawrence J. Staab
Assistant Examiner—Dwight G. Diehl
Attorney, Agent, or Firm—Edwin E. Greigg

[57] ABSTRACT

A gearing transmission has two operatively different sets of planetary transmission apparatuses and is adapted to enable speed changing in six steps in the forward running travel and in two steps in the rearward running travel. The two operatively different sets of planetary transmission apparatuses have only one common internal-tooth gear and only one common spider.

1 Claim, 3 Drawing Figures

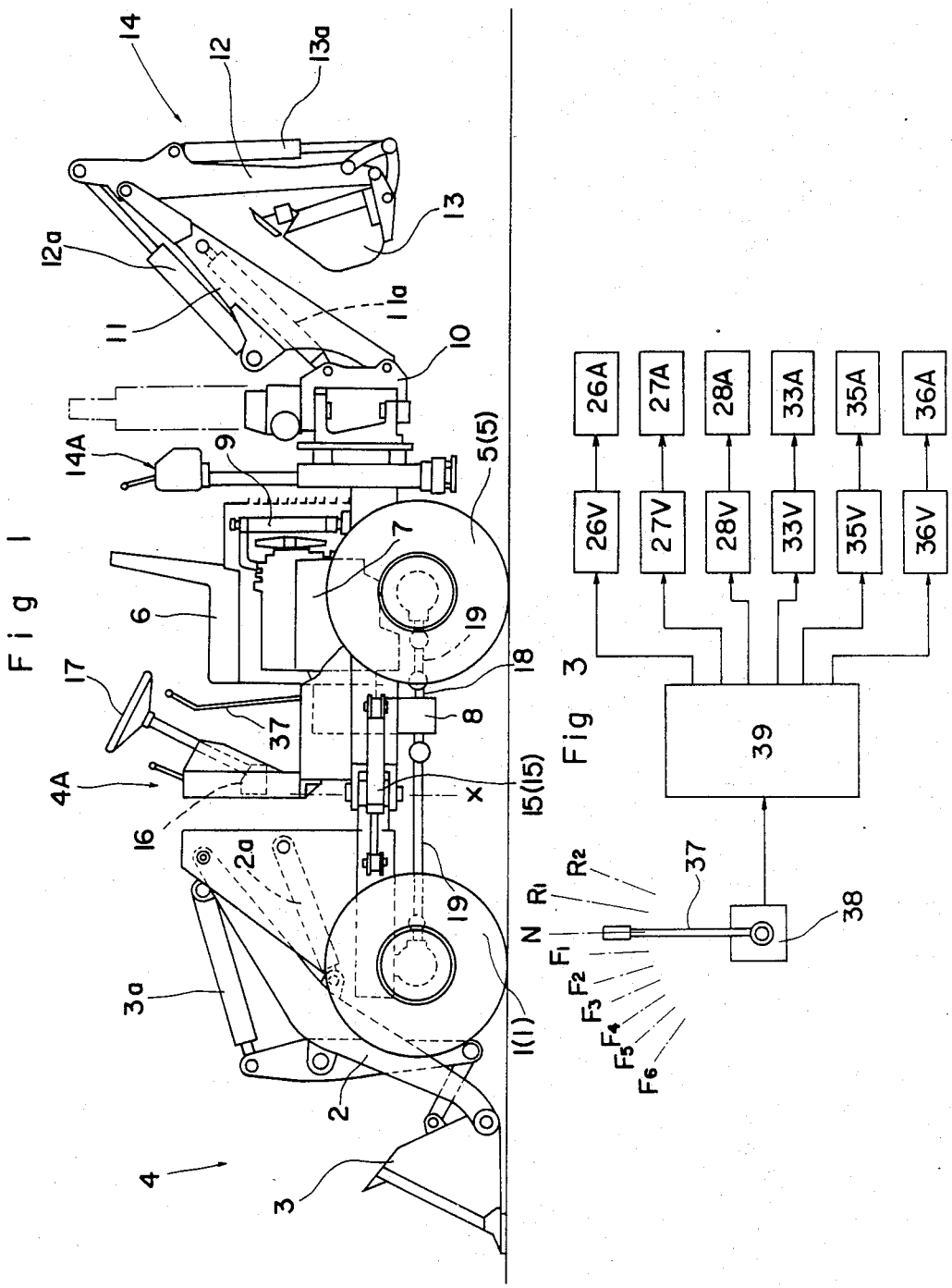

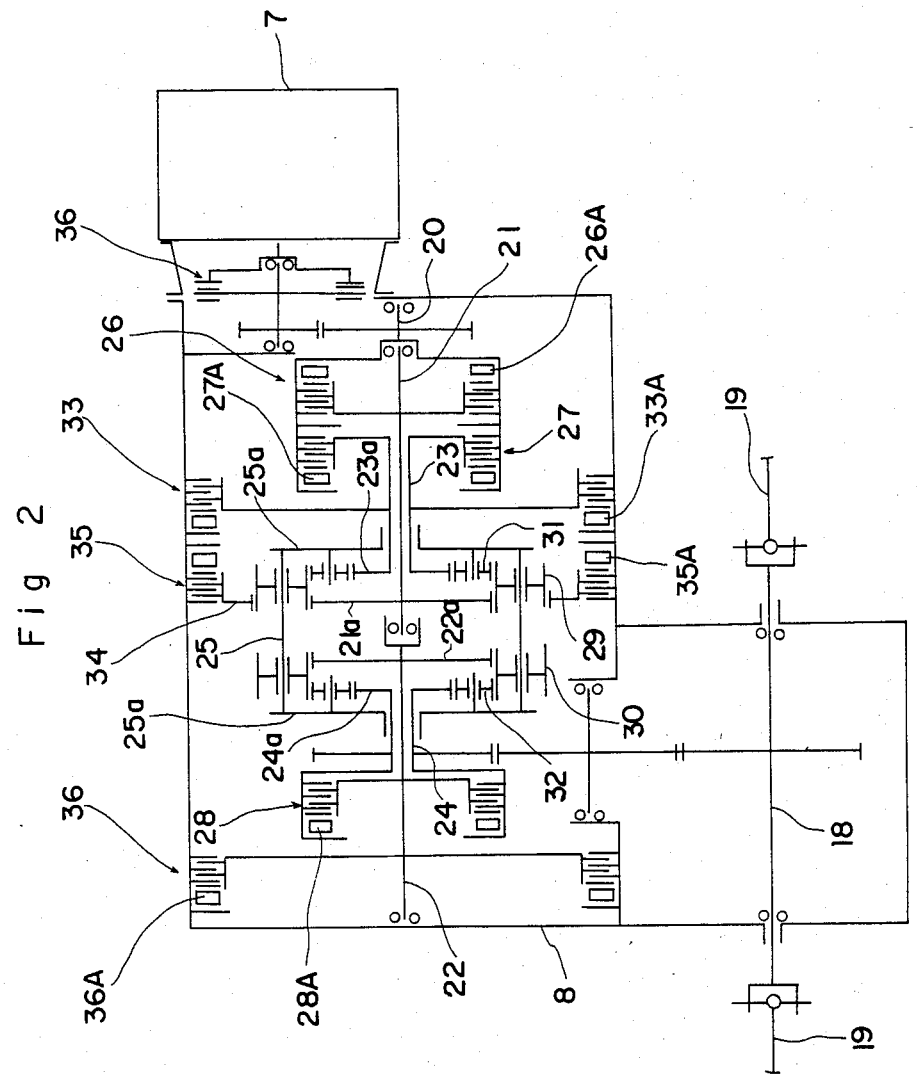

GEARING TRANSMISSION

BACKGROUND OF THE INVENTION (1) Field of the Invention

This invention relates to a gearing transmission equipped with planetary transmission apparatuses. More particularly, it relates to such gearing transmission in a work vehicle equipped with a dozer and/or a bucket, namely the work vehicle requiring the function of change-speed in quite many steps.

(2) Description of the Prior Art

As the change-speed apparatus in a work vehicle equipped with a dozer and/or a bucket, it is now preferred or normally prevailing to use an oilhydraulic-type drive-power transmission apparatus. It is noted, however, that such type of the apparatus is rather poor in the power transmission efficiency, and it is thus the trend to reconsider use of the transmission of gearing engagement type.

Particularly preferable in such trend of the use for the said type of work vehicle are the planetary transmission apparatuses, since they can provide the speed reduction in quite a wide range.

Thus, the problems herein encountered so far are the ways how to construct the planetary transmission apparatuses and how to dispose or incorporate them in the entire gearing transmission system, in order to realize the desired multiple-stage speed-changing function in simple and inexpensive overall structure. For instance, it is a problem, in the case of using two sets of the planetary transmission apparatuses, how to interconnect them in order to provide the entire structure as is most efficient and reasonable.

Such problem can not be solved simply by fractional or local design modification of the conventionally prevailing gearing transmission system, but rather requires entirely new construction of the whole system as must be built up from nothing at all thus on the ground or principle of quite innovated technical ideas.

SUMMARY OF THE INVENTION

This invention has as its object to provide the gearing transmission of low-cost and simple structure, yet enabling speed-changing in six steps in the forward running travel state and in two steps in the rearward running state.

To attain the object, the gearing transmission according to this invention is such that an input shaft, a first intermediary shaft and a second intermediary shaft are disposed to lie on one and the same common axis; that there are attached, respectively for free relative rotation, a tubular shaft for rearward travel on the said first intermediary shaft, and a tubular shaft for power output on the said second intermediary shaft; that both ends of a spider are respectively attached, each for free relative rotation, on both the said tubular shafts; that there are respectively provided, a first clutch between the said input shaft and first intermediary shaft, a second clutch between the said input shaft and tubular shaft for rearward travel, and a third clutch between the said second intermediary shaft and tubular shaft for power output; that on the said spider there are attached, respectively for free relative rotation, a third and a fourth externa-tooth gears which always mesh respectively with a first and a second external-tooth gears fixedly secured on the said first and second intermediary shafts, respectively; that on the said spider there further are attached, respectively for free relative rotation, a seventh and an eighth external-tooth gears which mesh respectively with a fifth and a sixth external-tooth gears fixedly secured on both the said tubular shafts, respectively, and which also mesh respectively with the said third and fourth external-tooth gears; that there are provided, a first brake for the said tubular shaft for rearward travel, a second brake for an internal-tooth gear which always meshes with the said third external-tooth gear, and a third brake for the said second intermediary shaft; and that there is provided a change-speed maneuvering apparatus which selectively maneuvers the said first through said third clutches and first through third brakes.

Since it is thus managed to provide the entire structure having only one single piece of internal-tooth gear, which is expensive in comparison with external-tooth gears, and also having only one single piece of spider, thereby restraining the structure from getting complicated as would be so in the case of using a plurality of spiders, for the support thereof in such case; this structure is quite inexpensive and simple, though providing yet the speed changing up to six steps in the forward running travel state and up to two steps in the rearward running travel state, resulting therefore in obtaining hereby a gearing transmission as is of enormous value in its practical use.

Still other advantages of this invention will be apparent from the description to follow hereunder.

BRIEF DESCRIPTION OF THE DRAWINGS

FIG. 1 is a side elevation of a work vehicle according to this invention, partly cut away;

FIG. 2 is a schematic side elevation of a gearing transmission; and

FIG. 3 is a block diagram of a change-speed maneuvering apparatus.

DESCRIPTION OF THE PREFERRED EMBODIMENT

As shown in FIG. 1, a work vehicle is constructed in such manner that a front vehicle body is provided as is equipped with a left and a right drivingly rotatable front wheels (1), (1) and also equipped with a front loader apparatus (4) consisting of an arm (2) as is maneuverable in up-and-down rocking with respect to the vehicle body by means of an oilhydraulic cylinder (2a), a bucket (3) as is maneuverable in up-and-down rocking with respect to the arm by means of an oilhydraulic cylinder (3a), and so forth; that a rear vehicle body is provided as is equipped with a left and right drivingly rotatable rear wheels (5), (5) and as is constructed in such manner that an engine (7) is thereon mounted underneath an operation seat (6), that a transmission case (8) for running travel is connected to a front portion of the engine (7), that a radiator (9) is disposed rearwardly of the engine (7), and that rearwardly of the operation seat (6) there is attached a backhoe apparatus (14) consisting of a mounting base (10) as is free for left-and-right sliding adjustment with respect to the vehicle body and as is free for left-and-right rocking with respect also to the vehicle body, a boom (11) as is maneuverable in up-and-down rocking with respect to the mounting base by means of an oilhydraulic cylinder (11a), arm (12) as is maneuverable in up-and-down rocking with respect to the boom by means of an oilhydraulic cylinder (12a), a bucket (13) as is maneuverable in up-and-down rocking with respect to the arm by means of an oilhydraulic cylinder (13a), and so forth; that the front vehicle body and the rear vehicle body are relatively pivoted for free rotation about an upright axis (X); that a left and a right oilhydraulic cylinders (15), (15) are disposed in bridging betweeen both the vehicle bodies; that on the rear vehicle body there is provided a steering wheel (17) as maneuvers in rotation a fully oilhydraulic type steering apparatus (16) for actuating the left and right oilhydraulic cylinders (15), (15) contradictorily in extension and contraction; that the operation seat (6) is mounted in a manner as is alterable in its posture for facing foward and rearward; that a maneuvering section (4A) for the front loader apparatus (4) and a maneuvering section (14A) for the backhoe apparatus (14) are provided respectively forwardly and rearwardly of the operation seat (6); and thus that the vehicle may effect the work of scooping soil and sand and transferring and discharging same, with the operation seat (6) in its state of facing forward, and may on the other hand effect the work of digging a ditch or the like, with the operation seat (6) in its state of facing rearward.

Within the said transmission case (8) for running travel, there is mounted a gearing transmission which effects speed changing as is supposed to change the forward travel speed in six steps and the rearward travel speed in two steps; and an output shaft (18), with it axis extending in the fore-and-aft direction, is journaled in piercing penetration through the transmission case (8); while there are provided transmission shafts (19), (19) which interconnect the output shaft (18) and the front and rear wheels (1), (5) and which are capable of extension and contraction as well as flection.

Adopted in constructing the said gearing transmission is the manner as shown in FIG. 2, such that an input shaft (20), a first intermediary shaft (21) and a second intermediary shaft (22) are disposed to lie on one and the same common axis; that there are attached, respectively for free relative rotation, a tubular shaft (23) for rearward travel on the said first intermediary shaft (21), and a tubular shaft (24) for power output on the said second intermediary shaft; that disk-like members (25a), (25a) at both end sides of a spider (25) are respectively attached, each for free relative rotation, on both the said tubular shafts (23), (24); that there are respectively provided, a first clutch (26) of multiple plate type between the said input shaft (20) and first intermediary shaft (21), a second clutch (27) of multiple plate type between the said input shaft (20) and tubular shaft (23) for rearward travel, and a third clutch (28) between the said second intermediary shaft (22) and tubular shaft (24) for power output; that on the said spider (25) there are attached, respectively for free relative rotation, a third and a fourth external-tooth gears (29), (30), which always mesh respectively with a first and a second external-tooth gears (21a), (22a) fixedly secured on the said first and second intermediary shafts (21), (22), respectively; that on the said spider (25) there further are attached respectively for free rotation, a seventh and an eighth external-tooth gears (31), (32), which mesh respectively with a fifth and a sixth external-tooth gears (23a), (24a) fixedly secured on both the said tubular shafts (23), (24), respectively, and which also mesh respectively with the said third and fourth external-tooth gears (29), (30); that there are provided, a multiple plate type first brake (33) for the said tubular shaft (23) for rearward travel, a multiple plate type second brake (35) for an internal-tooth gear (34) which always meshes with the said third external-tooth gear (29), and a third brake (36) for the said second intermediary shaft (22); that the input shaft (20) is interlockedly connected to the engine (7) via a running-travel clutch (40) and a gearing interlocking mechanism; and that the tubular shaft (24) for power output is interlockedly connected via a gearing interlocking mechanism to the output shaft (18). Furthermore, as shown in FIGS. 2 and 3, there are provided oilhydraulic cylinders (26A), (27A), (28A) for clutching-on meaneuvering respectively for the said first through third clutches (26), (27), (28) and oilhydraulic cylinders (33A), (35A), (36A) for braking-on maneuvering respectively for the first through third brakes (33), (35), (36); there are provided electromagnetic type regulation valves (26V), (27V), (28V), (33V), (35V), (36V) respectively for the cylinders (26A); there are provided a change-speed lever (37) in such state as is supported to be change-over maneuverable forwardly from its netural position (N) to its positions ($F_1$), ($F_2$), ($F_3$), ($F_4$), ($F_5$), ($F_6$) corresponding to the forward travel first speed through forward travel sixth speed and to be change-over maneuverable rearwardly from its netural position (N) to its positions ($R_1$), ($R_2$) corresponding to the rearward travel first speed and rearward travel second speed; there is provided an apparatus (38) which detects the positions of the lever (37) as variations of electrical signals; and there further is provided a valve-maneuvering circuit (39), under utilization of a microcomputer, which selectively energizingly actuates the said valves (26V) on the basis of the information of the detection apparatus (38) and the information memorized beforehand; to thereby result in providing the transmission so constructed as to enable the speed changing of six forward travel steps and two rearward travel steps by means of the rocking of the change-speed lever (37).

Describing in further particular, it is supposed that the forward travel first speed state is provided by the ON-shifting maneuvering of the first clutch (26), second brake (35) and third clutch (28), whereupon the rotary power of the first intermediary shaft (21) causes the spider (25) to rotate, via the third external-tooth gear (29) and the internal-tooth gear (34), and thus the tubular shaft (24) for power output rotates integrally with the spider (25).

As to the forward travel second speed state, it is supposed that the same is provided by the ON-shifting maneuvering of the first and third clutches (26), (28) and the first brake (33), whereupon the rotary power of the first intermediary shaft (21) causes the spider (25) to rotate, via the third, fifth and seventh external-tooth gears (29), (23a), (31) and thus the tubular shaft (24) for power output rotates integrally with the spider (25).

As to the forward travel third speed state, it is supposed that the same is provided by the ON-shifting maneuvering of the first clutch (26) and the second and third brakes (35), (36), whereupon the rotary power of the first intermediary shaft (21) causes the spider (25) to rotate as mentioned hereinbefore, and further the rotary power of the spider (25) causes the tubular shaft (24) for power output to rotate, via the second, fourth, sixth and eighth external-tooth gears (22a), (30), (24a), (32).

As to the forward travel fourth speed state, it is supposed that the same is provided by the ON-shifting maneuvering of the first, second and third clutches (26), (27), (28), whereupon the input shaft (20) and the output shaft (24) are caused to rotate integrally.

As to the forward travel fifth speed state, it is supposed that the same is provided by the ON-shifting maneuvering of the first clutch (26) and the first and third brakes (33), (36), whereupon the rotary power of the first intermediary shaft (21) causes the spider (25) to rotate as mentioned hereinbefore, and further the rotary power of the spider (25) causes the tubular shaft (24) for power output to rotate also as mentioned hereinbefore.

As to the forward travel sixth speed state, it is supposed that the same is provided by the ON-shifting maneuvering of the first and second clutches (26), (27) and the third brake (36), whereupon the input shaft (20) and the spider (25) are caused to rotate integrally, and further the rotary power of the spider (25) causes the tubular shaft (24) for power output to rotate as mentioned hereinbefore.

As to the rearward travel first speed state, it is supposed that the same is provided by the ON-shifting maneuvering of the second and third clutches (27), (28) and the second brake (35), whereupon the rotary power of the tubular shaft (23) for rearward travel causes the spider (25) to reversely rotate, via the internal-tooth gear (34) and the third, seventh and fifth external tooth gears (29), (31), (23a), while the spider (25) and the tubular shaft (24) for power output rotate integrally.

As to the rearward travel second speed state, it is supposed that the same is provided by the ON-shifting maneuvering of the second clutch (27) and the second and third brakes (35), (36), whereupon the rotary power of the tubular shaft (23) for rearward travel causes the spider (25) to reversely rotate as mentioned hereinbefore, and further the rotary power of the spider (25) causes the tubular shaft (24) for power output to rotate as mentioned hereinbefore.

In practicing this invention, it is as well possible to provide the speed changing in any step number less than the afore-mentioned six forward travel and two rearward travel steps, and in said afore-described case it is as well practical to omit the forward travel third speed, in view that the same in practice results in a speed closely alike or near the forward travel fourth speed.

Furthermore, the spider (25) may as well be constructed to have the said disk-like members (25a), (25a) at both end sides in an arm-like shape.

Yet further, the change-speed maneuvering apparatus could be modified to any various structures other than the above-described type designed for maneuvering by means of electrical signals using a microcomputer or the like; thus for instance as to construct the said valves (26V) for the cylinder (26A) in pilot-pressure maneuvering type and to provide the change-speed lever (37) so as to shiftingly maneuver a valve for pilot-pressure generation, and so forth.

I claim:

1. A gear transmission comprising
   an input shaft (20),
   a first intermediate shaft (21),
   a second intermediate shaft (22),
   said shafts being coaxial with one another,
   a tubular shaft for rearward travel (23) mounted for relative rotation on said first intermediate shaft (21),
   a tubular output shaft (24) mounted for relative rotation on said second intermediate shaft (22),
   a planetary gear mechanism comprising a spider (25) mounted at opposite ends on said two tubular shafts (23, 24) and rotatable relative thereto, a ring gear (34), a first planetary subunit, and a second planetary subunit,
   said first planetary subunit including
      a first sun gear (21a) secured to said first intermediate shaft (21),
      a second sun gear (23a) secured to said tubular shaft for rearward travel (23),
      a first planet gear (29) attached to said spider (25) to be in constant mesh with said first sun gear (21a), and
      a second planet gear (31) attached to said spider (25) to be in constant mesh with said second sun gear (23a) and said first planet gear (29),
   said second planetary subunit including
      a third sun gear (22a) secured to said second intermediate shaft (22),
      a fourth sun gear (24a) secured to said tubular output shaft (24),
      a third planet gear (30) attached to said spider (25) in constant mesh with said third sun gear (22a), and
      a fourth planet gear (32) attached to said spider (25) in constant mesh with said fourth sun gear (24a) and said third planet gear (30), wherein said spider (25) and said ring gear (34) are used commonly by said first and second planetary subunits,
   a first clutch (26) for connecting said input shaft (20) and said first intermediate shaft (21),
   a second clutch (27) for connecting said input shaft (20) and said tubular shaft (23) for rearward travel,
   a third clutch (28) for connecting said second intermeidate shaft (22) and said tubular output shaft (24),
   a first brake (33) which acts on said tubular shaft (23) for rearward travel,
   a second brake (35) which acts on said sing gear (34) and
   a third brake (36) which acts on said second intermediate shaft (22), whereby forward speeds are obtained by engaging said first clutch and selectively combining other said clutches and said brakes, and backward speeds are obtained by disengaging said first clutch, engaging said second clutch and selectively combining said third clutch and said brakes.

* * * * *